United States Patent
Kao et al.

(10) Patent No.: US 8,487,883 B2
(45) Date of Patent: *Jul. 16, 2013

(54) METHOD FOR OPERATING USER INTERFACE AND RECORDING MEDIUM FOR STORING PROGRAM APPLYING THE SAME

(75) Inventors: Yih-Feng Kao, Taoyuan County (TW); Te-Chuan Liu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 999 days.

This patent is subject to a terminal disclaimer.

(21) Appl. No.: 12/109,357

(22) Filed: Apr. 25, 2008

(65) Prior Publication Data

US 2008/0284754 A1   Nov. 20, 2008

(30) Foreign Application Priority Data

May 15, 2007   (TW) ............................... 96117292 A

(51) Int. Cl.
*G06F 3/045* (2006.01)

(52) U.S. Cl.
USPC ........... 345/173; 345/156; 345/174; 715/763; 715/782; 715/778; 715/810

(58) Field of Classification Search
USPC ................. 715/788, 810, 765, 766, 778, 700, 715/782, 763; 345/340, 163, 173, 348, 156, 345/157, 174; 178/18.05, 18.06, 18.09
See application file for complete search history.

(56) References Cited

U.S. PATENT DOCUMENTS

| 5,821,930 | A | * | 10/1998 | Hansen ......................... 715/702 |
| 5,943,052 | A | | 8/1999 | Allen et al. |
| 5,956,025 | A | * | 9/1999 | Goulden et al. .............. 715/716 |
| 6,292,173 | B1 | * | 9/2001 | Rambaldi et al. ............. 345/157 |
| 6,611,258 | B1 | | 8/2003 | Tanaka et al. |
| 6,897,833 | B1 | * | 5/2005 | Robinson et al. .............. 345/2.3 |
| 6,958,749 | B1 | * | 10/2005 | Matsushita et al. ........... 345/175 |
| 7,061,474 | B2 | | 6/2006 | Hinckley et al. |

(Continued)

FOREIGN PATENT DOCUMENTS

| CN | 1227014 A | 8/1999 |
| CN | 1624640 A | 6/2005 |
| CN | 1722070 A | 1/2006 |
| CN | 1838053 A | 9/2006 |
| EP | 1607850 | 12/2005 |

OTHER PUBLICATIONS

"Office Action of European counterpart application", issued on Nov. 16, 2009, p. 1-p. 6.

(Continued)

*Primary Examiner* — Lun-Yi Lao
*Assistant Examiner* — Kelly B Hegarty
(74) *Attorney, Agent, or Firm* — Jianq Chyun IP Office

(57) ABSTRACT

A method for operating a user interface and a recording medium for storing a program applying the same are provided. The method includes following steps. First, a touch generated by touching a touch display using an input tool is detected. Then, whether or not the touch is generated on a specific area of the touch display is determined. Next, whether the position of the touch is changed is determined if the touch is generated on the specific area. The user interface is activated or switched if the position of the touch is changed. Accordingly, a more convenient and intuitive method for operating the user interface is provided and the convenience in using the electronic device is increased.

16 Claims, 10 Drawing Sheets

U.S. PATENT DOCUMENTS

| | | |
|---|---|---|
| 2002/0191029 A1 | 12/2002 | Gillespie et al. |
| 2003/0179237 A1* | 9/2003 | Nelson et al. ............ 345/765 |
| 2005/0168441 A1 | 8/2005 | Obitsu et al. |
| 2006/0026521 A1* | 2/2006 | Hotelling et al. ......... 715/702 |
| 2006/0085760 A1* | 4/2006 | Anderson et al. ......... 715/778 |
| 2007/0162853 A1* | 7/2007 | Weber et al. ............. 715/719 |
| 2007/0281668 A1* | 12/2007 | Fleming ................ 455/414.1 |
| 2008/0094368 A1* | 4/2008 | Ording et al. ............ 345/173 |
| 2011/0065478 A1* | 3/2011 | Kim et al. ............... 455/566 |

OTHER PUBLICATIONS

"Office Action of China Counterpart Application" issued on Nov. 6, 2009, p. 1-p. 9.

Nokia6708 User's Guidebook <http://nds1.nokia.com/files/support/china/phones/guides/Nokia_6708_China_UG_zh-CN.pdf> Nokia, pp. 25-26, Dec. 31, 2005.

\* cited by examiner

METHOD FOR OPERATING USER INTERFACE AND RECORDING MEDIUM FOR STORING PROGRAM APPLYING THE SAME

CROSS-REFERENCE TO RELATED APPLICATION

This application claims the priority benefit of Taiwan application serial no. 96117292, filed on May 15, 2007. All disclosure of the Taiwan application and co-pending US patent application filed concurrently by the same applicant, entitled "ELECTRONIC DEVICE WITH SWITCHABLE USER INTERFACE AND ELECTRONIC DEVICE WITH ACCESSIBLE TOUCH OPERATION", which claims the priority benefit of Taiwan application serial no. 96117290, filed on May 15, 2007, are incorporated herein by reference.

BACKGROUND OF THE INVENTION

1. Field of the Invention

The present invention generally relates to a method for operating a user interface, in particular, to a method for operating a user interface of an electronic device and a computer readable recording medium for storing a program applying the same.

2. Description of Related Art

Along with the advancement of pointing stick and touch pad technique, touch screens is being adopted as a new input interface for replacing traditional keyboards in electronic products, such as notebook computers, cell phones, and portable multi-media players etc. For example, when a user uses a traditional cell phone to input text or select a menu item, the user has to click at the keyboard while looking at the image displayed on the screen at the same time. However, if a cell phone having a touch screen is used, the user can input text or start an application program directly on the screen by using a stylus. Accordingly, touch screen is a more convenient input technique.

The sizes of touch screens on some compact handheld electronic devices are very limited therefore the sizes of menu items in the user interfaces have to be reduced, so that the screens can display as many function options as possible. For example, regarding a handheld electronic device built in with a Windows operating system (OS), the Windows OS supports many different functions and these functions are mostly displayed in the "start" function list as hierarchic menu items. Thus, if a user wants to start a specific function, the user has to click at the "start" function list, then looks for the menu item corresponding to the specific function in the function list, and eventually clicks at the menu item in the function list to start the specific function. A desired menu has to be opened through such hierarchical selection, which is very inconvenient to a handheld electronic device.

Besides, if the user loses the stylus or forgets to bring it with him/her, the user may have to input text or select menu items with his/her finger. In this case, an incorrect menu item may be selected and accordingly an undesired user interface may be activated due to the small size of the menu. Then the user has to return to the previous level of the user interface and re-selects the menu item to activate the correct user interface. As described above, unnecessary operation time is consumed by such situation. Accordingly, how to allow a user to activate various user interfaces in a touch screen directly with his/her finger and accordingly to operate on these user interfaces conveniently is one of the most important factors for improving the convenience in the operation of a electronic device.

In addition, the case of a traditional handheld electronic device is usually closely attached around the display area of the touch display and is much higher than the touch sensing surface of the touch display. The extruding part of the case may encumber the operation of an input tool (for example, a finger or a stylus) and may hurt the user's finger, therefore the user cannot touch the pixels at the edges of the display area quickly and effectively and accordingly cannot operate the user interface smoothly. In addition, the non-display area of the touch display may also sense touches and is usually covered by the case of a handheld electronic device, which not only obstructs the operation of the user but also restricts the application of the touch display.

SUMMARY OF THE INVENTION

Accordingly, the present invention is directed to a method for operating a user interface and a computer readable recording medium for storing a program executing the same, wherein different user interfaces can be activated or switched according to the position and moving direction of a touch generated by touching a touch display using an input tool.

The present invention is directed to a method for operating a user interface suitable for an electronic device having a touch display. The method includes following steps. First, a touch generated by touching the touch display using an input tool is detected. Then, whether the touch is generated on a specific area of the touch display is determined. After that, if the touch is generated on the specific area, whether the position of the touch on the touch display is changed is determined. Next, if the position of the touch on the touch display is changed, the user interface is activated.

The present invention further provides a method for operating a user interface suitable for an electronic device having a touch display. The method includes following steps. First, a touch generated by touching the touch display using an input tool is detected, and whether the touch is generated on a specific area of the touch display is determined. Next, if the touch is generated on the specific area, whether the position of the touch on the touch display is changed is determined. After that, if the position of the touch on the touch display is changed, the user interface is switched according to the moving direction of the touch.

The present invention provides a computer readable recording medium for storing a program, wherein the program executes following steps. First, a touch generated by touching a touch display using an input tool is detected. Then, whether the touch is generated on a specific area of the touch display is determined. If the touch is generated on the specific area, whether the position of the touch on the touch display is changed is determined. If the position of the touch on the touch display is changed, a user interface is activated.

The present invention further provides a computer readable recording medium for storing a program, wherein the program executes following steps. First, a touch generated by touching a touch display using an input tool is detected, and whether the touch is generated on a specific area of the touch display is determined. Next, if the touch is generated on the specific area, whether the position of the touch on the touch display is changed is determined. If the position of the touch on the touch display is changed, a user interface is switched according to the moving direction of the touch.

According to the present invention, the position and moving direction of a touch generated by touching a touch display using an input tool are detected, and a user interface is activated or switched according to the position and moving direction of the touch. Accordingly, the desired user interface can be entered quickly and the convenience in the operation of an electronic device can be increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
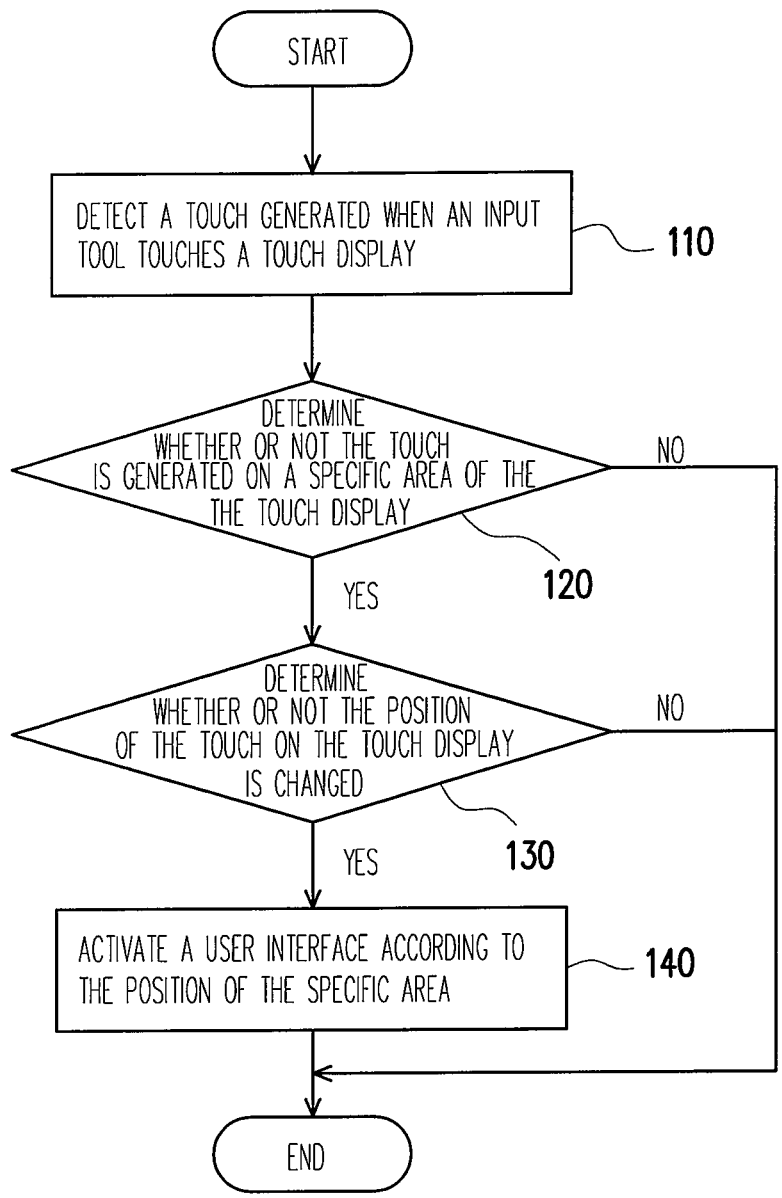
FIG. 1 is a flowchart illustrating a method for operating a user interface according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

While using an electronic device having a touch display, the operation time could be shortened and the operation efficiency could be improved if different user interfaces can be activated or switched without selecting any menu items. Accordingly, the present invention is directed to a method for operating a user interface which offers foregoing advantages. Embodiments of the present invention will be described in details with reference to accompanying drawings.

FIG. 1 is a flowchart illustrating a method for operating a user interface according to an embodiment of the present invention. In the present embodiment, the detailed procedure of activating a user interface in the touch display of an electronic device will be described, wherein the electronic device may be a cell phone, a personal digital assistant (PDA), a smart phone, or a notebook computer etc, and the scope thereof is not limited herein.

Referring to FIG. 1, first, a touch generated while touching the touch display with an input tool is detected in step 110, wherein the input tool may be a finger of the user or a stylus. In the electronic device 200 illustrated in FIG. 2, the touch display 210 is divided into a display area 211 and a non-display area 213, wherein the display area 211 is a well-known touch screen area which is used for both displaying images and receiving operations such as text input or menu selections from the user. Even though the non-display area 213 cannot display images, it can also sense user contacts therefore can be used for detecting the operation of the input tool. In the present embodiment, the display area 211 and the non-display area 213 of the touch display 210 may be located on the same surface or different surfaces, which is not restricted herein.

Figure 2:
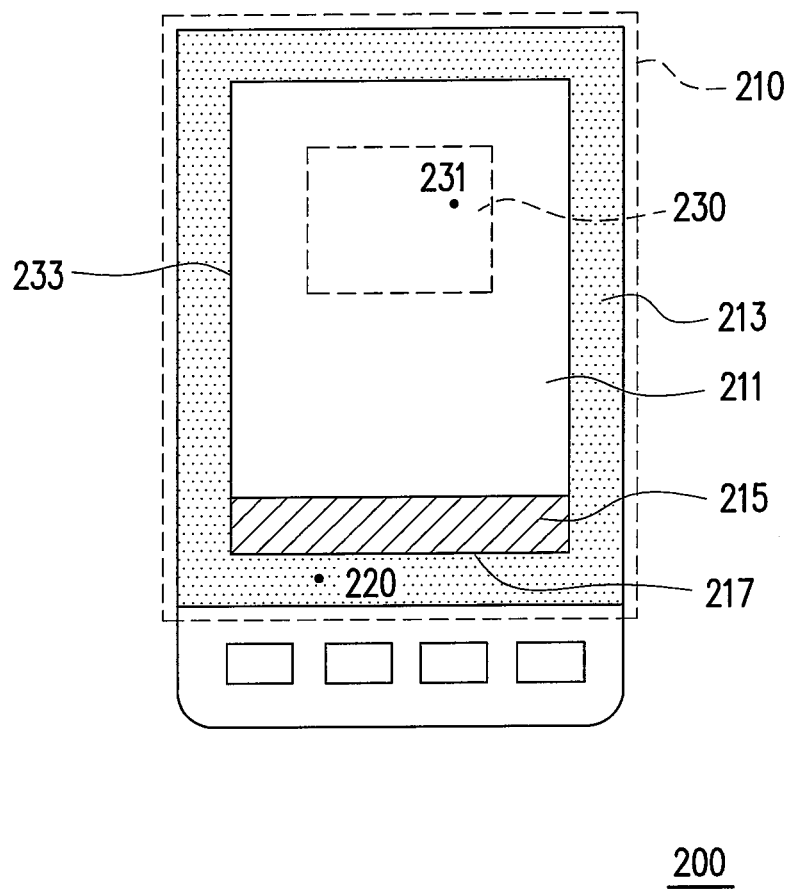
FIG. 2 is a diagram of an electronic device according to an embodiment of the present invention.

Next, in step 120, whether or not the touch is generated on a specific area of the touch display is determined. The specific area includes a marginal area close to an edge of the display area (i.e. the area going inwardly from an edge of the display area within the size of a finger contact, for example, the marginal area 215 as shown in FIG. 2), a central area of the display area 211 (i.e. the area in the display area excluding the marginal area, for example, the central area 230 as shown in FIG. 2), or the non-display area of the touch display (for example, the non-display area 213 as shown in FIG. 2).

If the touch is generated on the specific area of the touch display, then in step 130, whether or not the position of the touch on the touch display is changed is determined. To be specific, to determine whether or not the position of the touch on the touch display is changed, first, a moving distance of the touch has to be calculated, wherein the moving distance may be a moving distance produced within a predetermined time (for example, 0.2 second). Next, the moving distance is compared with a predetermined value, and it is determined that the position of the touch on the touch display is changed if the distance is greater than the predetermined value. In other words, the change in the position of the touch shows that the input tool moves within the predetermined time after it touches the touch display.

Finally, in step 140, the user interface may be activated according to the position of the specific area. To activate the user interface, the user interface is dragged out from a display edge of the touch display and then displayed, while in the present embodiment, the user interface is dragged out from the edge of the display area closest to the touch and then displayed in the display area.

For example, if the marginal area 215 is used as the specific area for activating a user interface in the electronic device 200, after the user touches the marginal area 215 with his/her finger and moves his/her finger a distance longer than the predetermined value, a new user interface is dragged out from the edge 217 of the display area 211 and displayed in the display area 211.

In another embodiment of the present invention, if the non-display area 213 is used as the specific area for activating a user interface in the electronic device 200, after the user touches the touch point 220 in the non-display area 213 with his/her finger and moves his/her finger a distance longer than the predetermined value, the user interface is activated at the edge closest to the touch point 220 (i.e. the edge 217 of the display area 211) and dragged into the display area 211.

Figure 3:
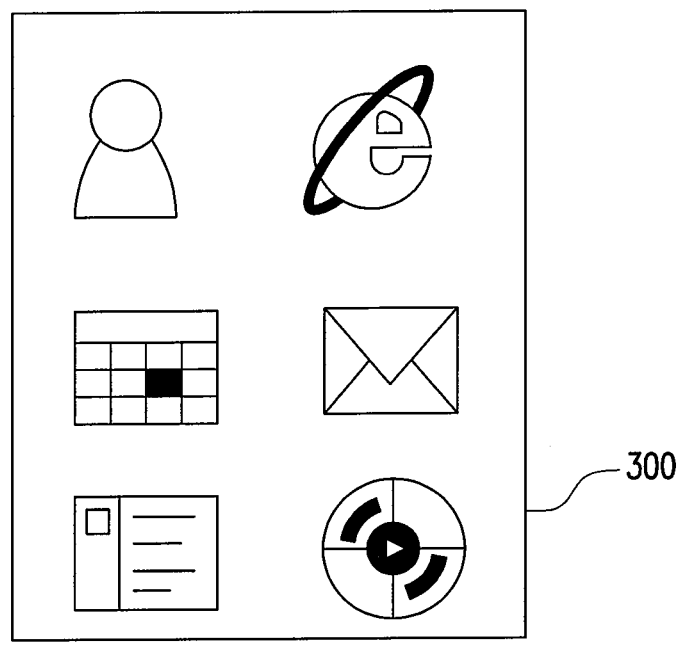
FIG. 3 is a diagram of a user interface according to an embodiment of the present invention.
Figure 4:
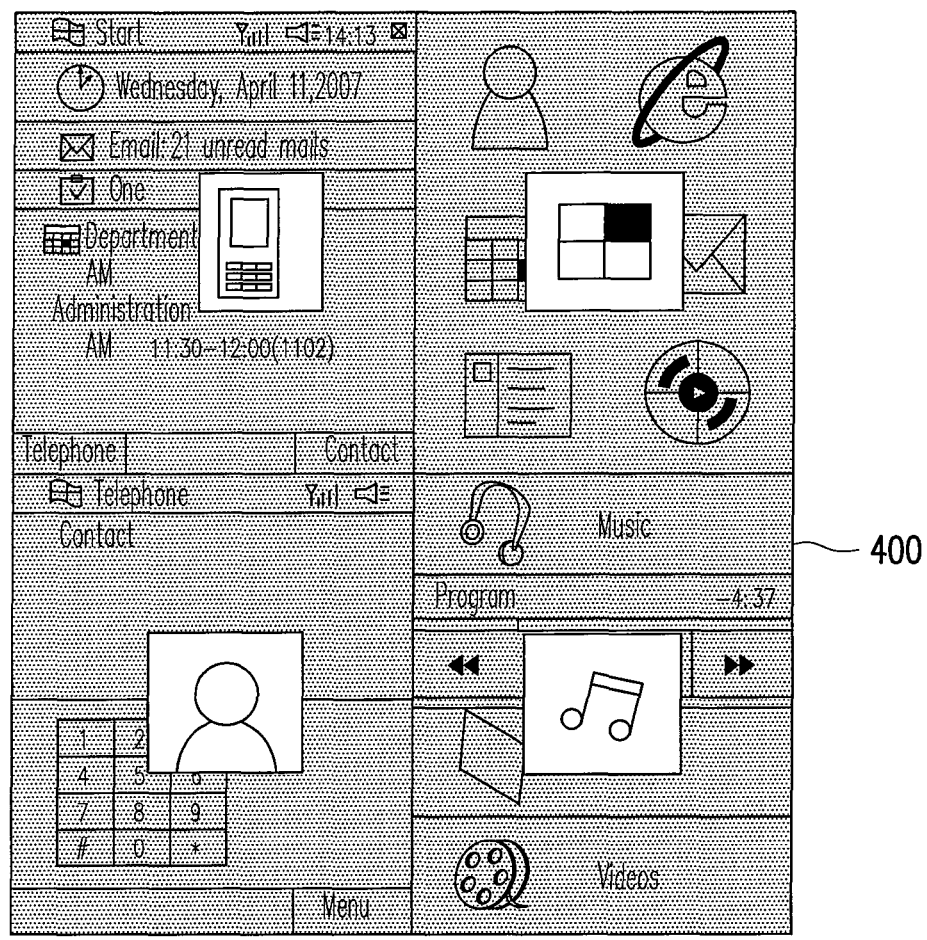
FIG. 4 is a diagram of a user interface according to an embodiment of the present invention.
Figure 5:
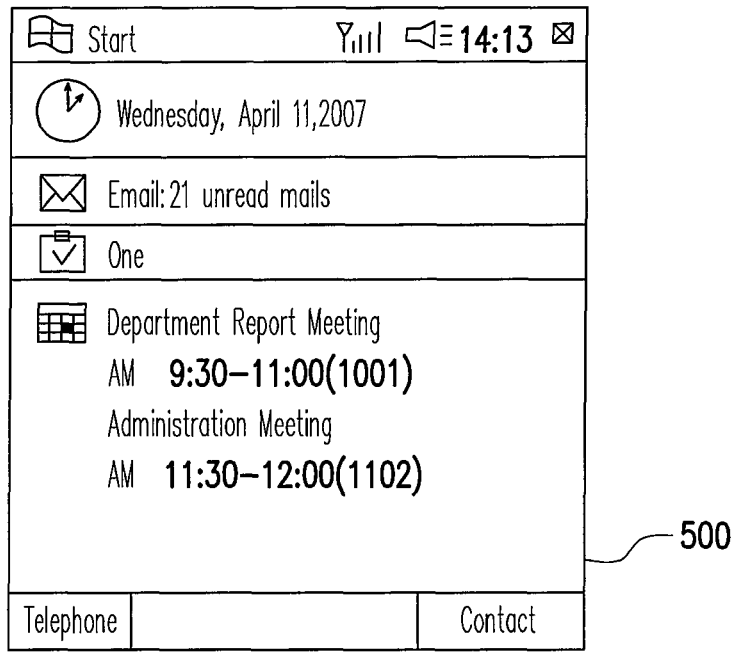
FIG. 5 is a diagram of a user interface according to an embodiment of the present invention.

In the embodiment described above, the activated user interface may be a user interface having a finger-touchable icon (for example, the user interface 300 as shown in FIG. 3), a user interface having a finger-touchable image (for example, the user interface 400 as shown in FIG. 4), or a common user interface (for example, the user interface 500 as shown in FIG. 5), wherein the finger-touchable image may be a miniature of the screenshot of an application program.

In another embodiment of the present invention, a user interface has been displayed in an electronic device, and another user interface can be activated, switched, or closed on the original user interface from a display edge of the touch display (for example, the edge of the display area closest to the touch) through the same or a similar procedure as illustrated in FIG. 1.

For example, through the method described above, a user can activate a common user interface having at least one timing information and at least one event notification (for example, the user interface 500 as shown in FIG. 5) on a user interface having a finger-touchable icon (for example, the user interface 300 as shown in FIG. 3). Or, the user can activate a common user interface having at least one timing information and at least one event notification (for example, the user interface 500 as shown in FIG. 5) on a user interface having a finger-touchable image (for example, the user interface 400 as shown in FIG. 4). Moreover, the user also can activate a user interface having a finger-touchable icon or a finger-touchable image (for example, the user interface 300 in FIG. 3 and the user interface 400 in FIG. 4) on a common user interface having at least one timing information and at least one event notification (for example, the user interface 500 as shown in FIG. 5). Furthermore, the user can activate a user interface having a finger-touchable image (or finger-touchable icon) on another user interface having a finger-touchable image (or finger-touchable icon).

Figure 6:
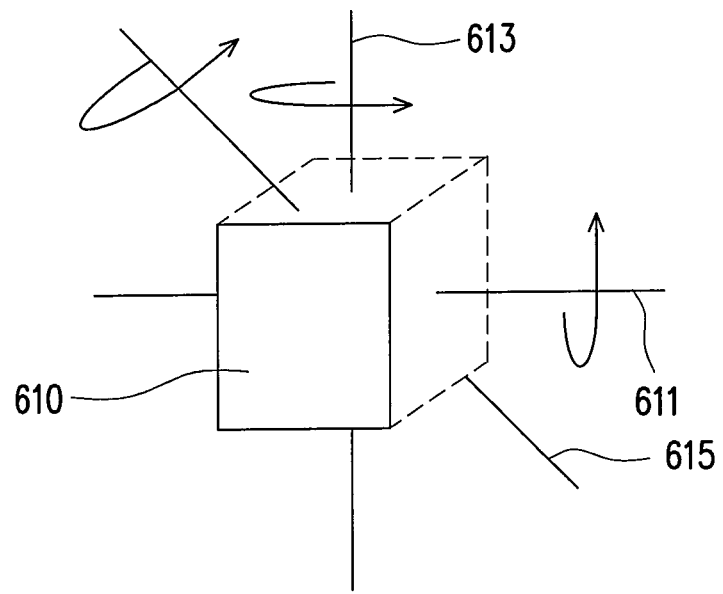
FIG. 6 is a diagram of a 3D motion user interface according to an embodiment of the present invention.

In the present embodiment, the original user interface and the user interface activated later on are respectively located on two surfaces (for example, two adjacent surfaces) of a 3D motion user interface (for example, the 3D motion user interface 610 as shown in FIG. 6). The 3D motion user interface 610 may be a polyhedron or a cube, and the scope thereof is not limited herein. The 3D motion user interface 610 rotates around an axis. For example, as shown in FIG. 6, the 3D motion user interface 610 may rotate upwards around the axis X 611, rotates rightwards around the axis Z 613, or rotates around the tilted axis 615.

It should be mentioned that the method for operating a user interface described above may be executed in any system having computer functionalities. In other words, foregoing embodiment may be implemented as a computer program, and the computer program can be stored in a computer readable recording medium (for example, a CD-ROM or a hard disk) and loaded into a computer system so that foregoing method for operating a user interface can be executed.

Figure 7:
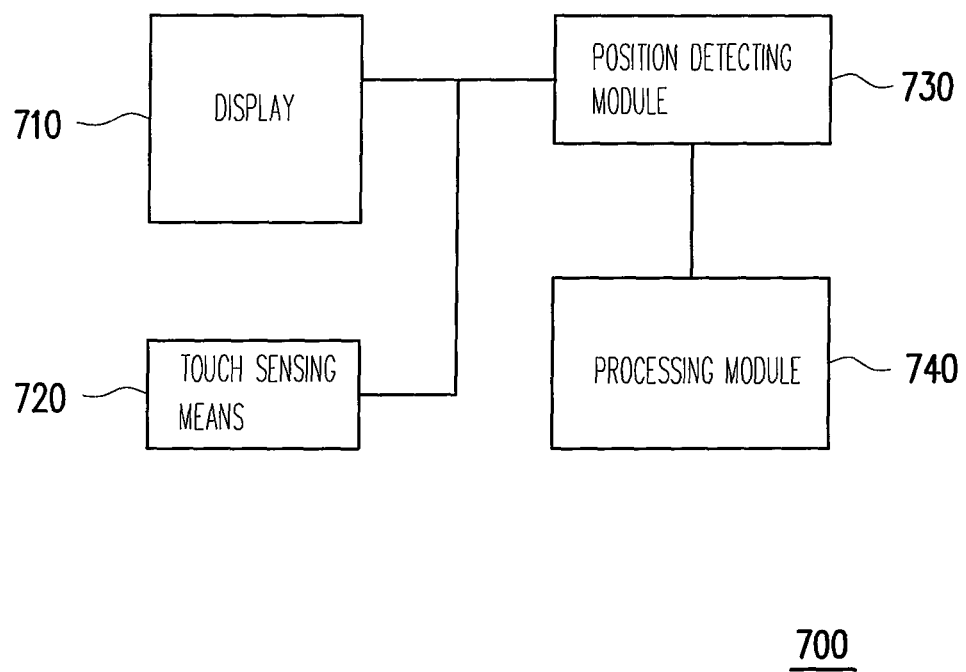
FIG. 7 is a diagram of an electronic device having a switchable user interface according to an embodiment of the present invention.

FIG. 7 is a diagram of an electronic device having a switchable user interface according to an embodiment of the present invention. Referring to FIG. 7, the electronic device 700 includes a display 710, a touch sensing means 720, a position detecting module 730, and a processing module 740.

The touch sensing means 720 detects a touch generated by an input tool (for example, a finger of a user or a stylus). In the present embodiment, the touch sensing means 720 may be a touch pad or a touch panel. The touch sensing means 720 and the display 710 form a touch display if the touch sensing means 720 is a touch panel. Accordingly, the touch panel includes a display area and a non-display area corresponding to the display 710, wherein the display area and the non-display area may be located on the same surface or different surfaces.

The position detecting module 730 is connected to the display 710 and the touch sensing means 720 is used for determining whether or not the touch is generated on a specific area of the touch sensing means 720. In the present embodiment, the specific area includes a marginal area of the display area, a central area of the display area excluding the marginal area, or the non-display area. If the touch is generated on the specific area, the position detecting module 730 determines whether or not the position of the touch on the touch display is changed.

The processing module 740 is connected to the position detecting module 730, and when the position detecting module 730 determines that the position of the touch on the touch display is changed, the processing module 740 activates and displays a user interface on the display 710 according to the position of the specific area.

Through the user interface operating method described above, a user can operate the electronic device 700 to activate a new user interface or to activate another user interface for replacing an existing user interface by using a finger or a stylus. The operating method is similar to the embodiment described above therefore will not be described herein.

Figure 8:
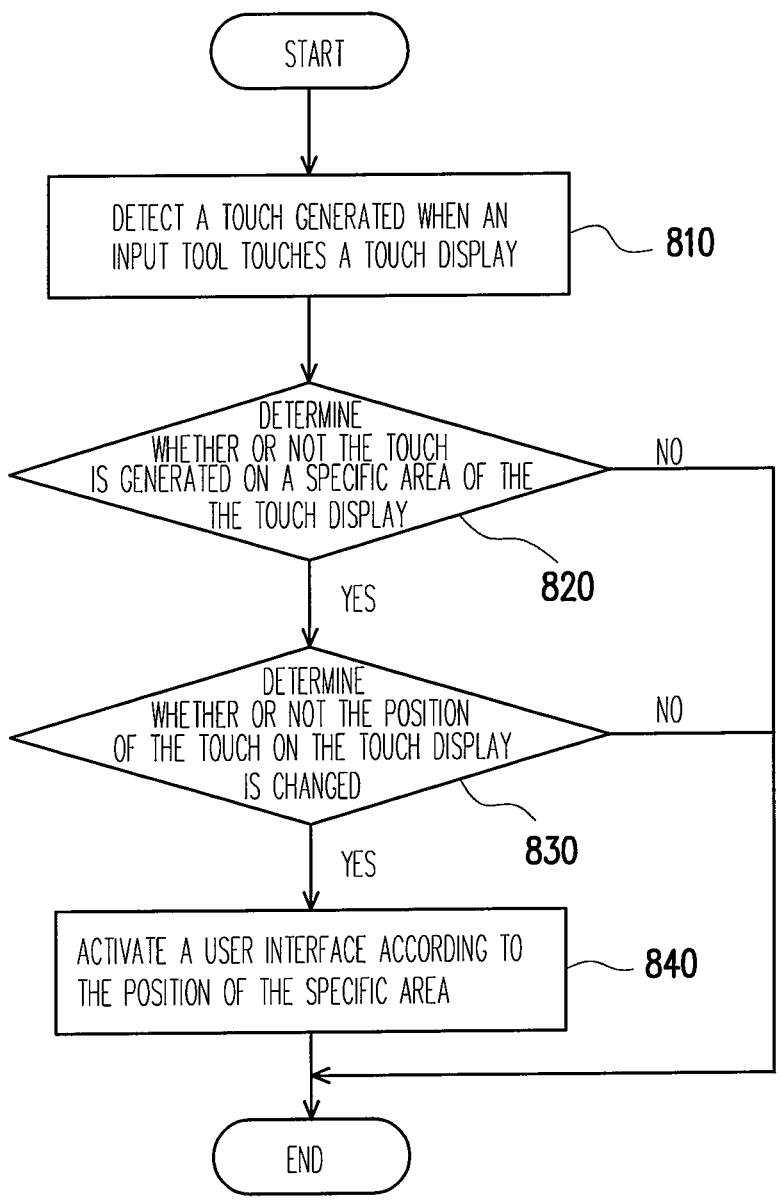
FIG. 8 is a flowchart illustrating a method for operating a user interface according to another embodiment of the present invention.

FIG. 8 is a flowchart illustrating a method for operating a user interface according to another embodiment of the present invention. In the present embodiment, the method provided by the present invention for switching a user interface in an electronic device will be further described in details. The touch display is divided into a display area and a non-display area. Referring to FIG. 8, first, in step 810, when the user operates the electronic device using an input tool, a touch generated while the input tool touches the touch display is detected, wherein the input tool may be a finger of the user or a stylus.

Next, in step 820, whether the touch is generated on a specific area of the touch display is determined. In the present embodiment, the specific area may be a marginal area in the display area of the touch display (for example, the marginal area 215 as shown in FIG. 2), a central area in the display area excluding the marginal area (for example, the central area 230 as shown in FIG. 2), or a non-display area (for example, the non-display area 213 as shown in FIG. 2).

If the touch is generated on the specific area, whether the position of the touch on the touch display is changed is then determined in step 830. For example, when the user drags the input tool on the touch display, the position of the touch between the input tool and the touch display is then changed, and accordingly a moving distance of the touch is calculated. It is determined that the position of the touch on the touch display is changed when the moving distance is greater than a predetermined value. To be specific, by calculating the moving distance of the touch within a predetermined time and comparing the moving distance and the predetermined value to determine whether the position of the touch on the touch display is changed, the action of the user to select a menu item with the input tool will not be misunderstood as an action to switch a user interface, and accordingly incorrect response of the electronic device can be avoided.

Finally, in step 840, the user interface is switched according to the moving direction of the touch. To switch a user interface, the user interface is dragged out from a display edge of the touch display opposite to the moving direction of the touch. In the present embodiment, the user interface may be a user interface having a finger-touchable icon (for example, the user interface 300 as shown in FIG. 3), a user interface having a finger-touchable image (for example, the user interface 400 as shown in FIG. 4), or a common user interface (for example, the user interface 500 as shown in FIG. 5), wherein the finger-touchable image may be a miniature of the screenshot of an application program.

For example, if the central area 230 in FIG. 2 is used as the specific area and the touch generated when the input tool touches the touch display is located at the touch point 231, then after the user drags the input tool to the right of the touch display to a distance longer than the predetermined value, the user interface slides out from the edge 233 (i.e. the edge of the display area to the left of the touch point 231) and is displayed in the display area 211.

In another embodiment of the present invention, a user interface may have been activated in an electronic device, and this original user interface can be switched through a similar method as described above. Switching a user interface includes closing an original user interface, activating another user interface on the original user interface, and switching from the original user interface to another user interface. For example, through the operating method described above, a user interface having a finger-touchable icon or a finger-touchable image (for example, the user interface 300 in FIG. 3 or the user interface 400 in FIG. 4) may be switched to a common user interface (for example, the user interface 500 as shown in FIG. 5). Contrarily, a common user interface may also be switched to a user interface having a finger-touchable icon or a finger-touchable image. Besides, a user interface having a finger-touchable icon or a finger-touchable image may also be switched to another user interface having a finger-touchable icon or a finger-touchable image.

In the present embodiment, the original user interface and the user interface activated later on are respectively located on two surfaces (for example, two adjacent surfaces) of a 3D motion user interface (for example, the 3D motion user interface 610 as shown in FIG. 6). The 3D motion user interface 610 may be a polyhedron or a cube. As shown in FIG. 6, the 3D motion user interface 610 rotates around an axis. For example, the 3D motion user interface 610 may rotate upwards around the axis X 611, rotate rightwards around the axis Z 613, or rotates around a tilted axis 615.

The method for operating a user interface described above may be executed in any system having computer functionalities. In other words, foregoing embodiment may be implemented as a computer program, and the computer program can be stored in a computer readable recording medium (for example, a CD-ROM or a hard disk) and loaded into a computer system so that foregoing method for operating a user interface can be executed.

Figure 9:
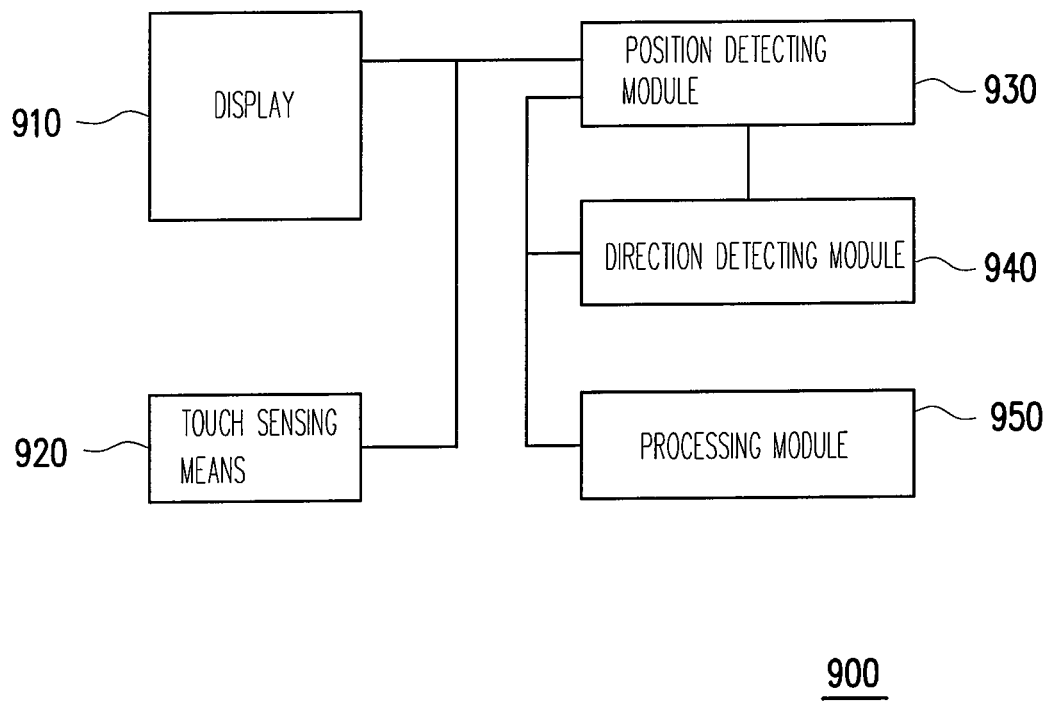
FIG. 9 is a diagram of an electronic device having a switchable user interface according to an embodiment of the present invention.

FIG. 9 is a diagram of an electronic device having a switchable user interface according to an embodiment of the present invention. Referring to FIG. 9, the electronic device 900 includes a display 910, a touch sensing means 920, a position detecting module 930, a direction detecting module 940, and a processing module 950.

The touch sensing means 920 detects a touch generated by an input tool (for example, a finger of a user or a stylus). In the present embodiment, the touch sensing means 920 may be a touch pad or a touch panel. The touch sensing means 920 and the display 910 form a touch display if the touch sensing means 920 is a touch panel. The touch panel includes a display area and a non-display area corresponding to the display 910, wherein the display area and the non-display area may be located on the same surface or difference surfaces, and which is not restricted herein.

The position detecting module 930 is connected to both the display 910 and the touch sensing means 920 and determines whether the touch is generated a specific area of the touch sensing means 920. In the present embodiment, the specific area includes a marginal area of the display area, a central area excluding the marginal area in the display area, or the non-display area. If the touch is generated on the specific area, the position detecting module 930 determines whether or not the position of the touch on the touch display is changed.

The direction detecting module 940 is connected to the position detecting module 930 and detects the moving direction of the touch. The processing module 950 is connected to both the position detecting module 930 and the direction detecting module 940, and when the position detecting module 930 determines that the position of the touch on the touch display is changed, the processing module 950 switches the user interface on the display 910 according to the moving direction of the touch detected by the direction detecting module 940.

Through the user interface operating method described above, a user can operate the electronic device 900 to switch a user interface or to switch to a new user interface on an existing user interface by using a finger or a stylus. The operating method is similar to the embodiment described above therefore will not be described herein.

Figure 10A:
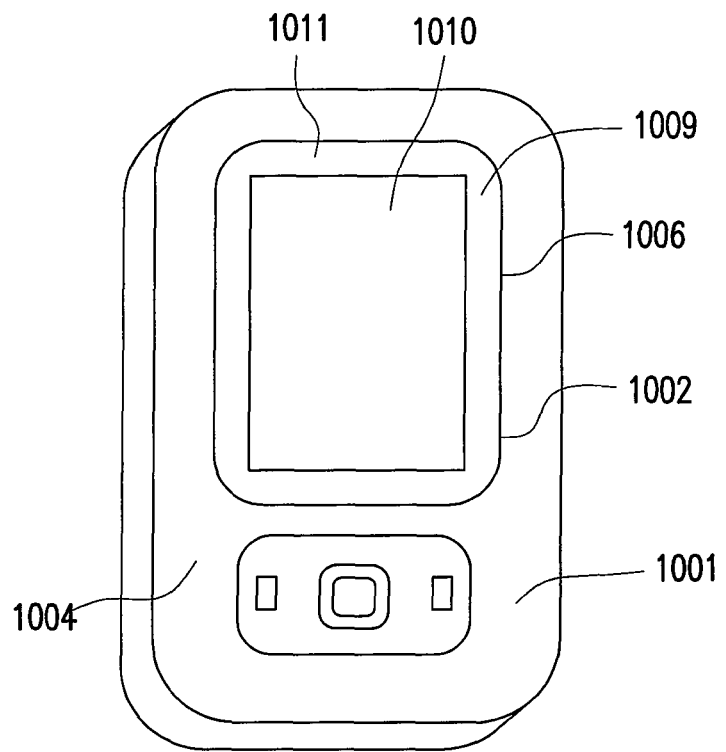
FIG. 10A is a perspective view of a handheld electronic device with obstructionless touch operation according to an embodiment of the present invention.
Figure 10B:
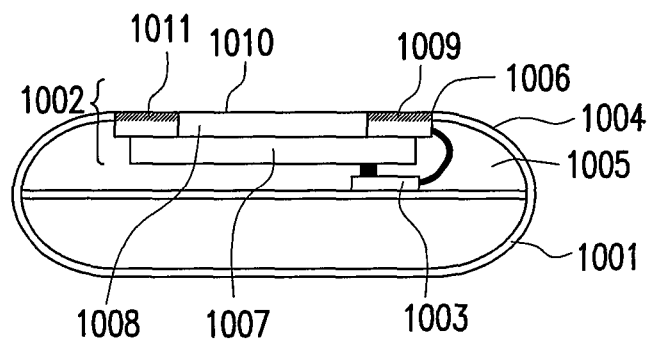
FIG. 10B is a cross-sectional view of the electronic device in FIG. 10A.

FIG. 10A is a perspective view of a handheld electronic device with obstructionless touch operation according to an embodiment of the present invention, and FIG. 10B is a cross-sectional view of the electronic device in FIG. 10A. The electronic device includes a case 1001, a touch display 1002, and a processor 1003. The case 1001 has an external surface 1004 and a containing space 1005, wherein the containing space 1005 is connected to the surroundings through an opening 1006 on the external surface 1004. The touch display 1002 includes a display 1007 and a touch sensing means 1008. The display 1007 is disposed in the containing space 1005 of the case 1001. The touch sensing means 1008 is disposed in the opening 1006 on the external surface 1004 of the case 1001 and receives a touch generated by an input tool. The touch sensing means 1008 has a touch sensing surface 1009, wherein the touch sensing surface 1009 includes a display area 1010 and a non-display area 1011. The fringe of the opening 1006 on the case 1001 is connected continuously to the touch sensing surface 1009, and the external surface 1004 of the case 1001 is not higher than the touch sensing surface 1009. Here the case 1001 does not include the hotkeys or buttons on a handheld electronic device. The processor 1003 is coupled to the display 1007 and the touch sensing means 1008 and determines whether or not the touch is generated on a specific area of the touch display 1002. If the touch is generated on the specific area, then the processor 1003 determines whether the position of the touch on the touch display is changed and detects the moving direction of the touch. When the position of the touch on the touch display is changed, the processor 1003 activates and displays a user interface or switches the user interface in the touch display 1002 accordingly to the moving direction of the touch.

It should be mentioned that since the external surface 1004 of the case 1001 is not higher than the touch sensing surface 1009, the external surface 1004 of the case 1001 and the touch sensing surface 1009 form a continuous smooth surface which allows the user to move and operate the input tool obstructionless. Moreover, the non-display area 1011 exposed by the touch sensing surface 1009 is not covered by the case 1001 as in prior art, thus, in the design of a handheld electronic device, an input tool can be moved and operated obstructionless, and besides, the non-display area 1011 can be fully utilized and more convenient operations can be provided to the user.

As described in foregoing embodiment, the processor 1003 can activate, switch, or close a user interface according to the position and moving direction of a touch generated while the input tool touches the touch sensing means 1008. The details of the method, such as operation procedure and functionalities thereof, have been described in foregoing embodiment therefore will not be described herein.

In overview, the user interface operating method provided by the present invention has at least following advantages:

1. a user can activate or switch different user interfaces by directly dragging an input tool on the touch display, so that the time for activating the user interface is shortened and the operation efficiency is improved.

2. an easier and more intuitive method for activating or switching a user interface is provided to the users so that the time required by a user to get familiar with the operation of an electronic device is shortened and the convenience in the usage of the electronic device is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for operating a first user interface which has at least one timing information and at least one event notification, suitable for a an electronic device having a touch display, the method comprising:

displaying a second user interface having a plurality of finger-touchable icons arranged in an array form on the touch display, wherein each of the plurality of finger-touchable icons is corresponding to an application program;

detecting a touch generated by an input tool;

determining whether or not the touch is generated on a specific area of the touch display;

determining whether or not the position of the touch on the touch display is changed if the touch is generated on the specific area; and if it is determined that the touch is generated on the specific area and it is determined that the position of the touch on the touch display is changed, activating the first user interface by dragging the first user interface, which has the at least one timing information and the at least one event notification, out from a display edge of the touch display to replace the second user interface, having the plurality of finger-touchable icons arranged in the array form, on the touch display, wherein the specific area is close to the display edge, and wherein the first user interface and the second user interface are respectively located on two adjacent surfaces of a 3D motion user interface.

2. The method according to claim 1, wherein the step of determining whether or not the position of the touch on the touch display is changed comprises:

calculating a moving distance of the touch within a predetermined time;

determining whether or not the moving distance is greater than a predetermined value; and determining that the position of the touch is changed if the moving distance is greater than the predetermined value.

3. The method according to claim 1, wherein the input tool comprises a finger or a stylus.

4. The method according to claim 1, wherein the timing information is associated with a time or a date, and the event notification is associated with a personal schedule or an unread message.

5. A method for operating a first user interface having a first plurality of finger-touchable icons arranged in a first array form, suitable for an electronic device having a touch display, the method comprising:

displaying a second user interface having a second plurality of finger-touchable icons arranged in a second array form on the touch display, wherein each of the first and the second plurality of finger-touchable icons is corresponding to an application program;

detecting a touch generated by an input tool;

determining whether or not the touch is generated on a specific area of the touch display;

determining whether or not the position of the touch on the touch display is changed if the touch is generated on the specific area; and if it is determined that the touch is generated on the specific area and it is determined that the position of the touch on the touch display is changed, switching the second user interface, having the second plurality of finger-touchable icons arranged in the second array form, to the first user interface, having the first plurality of finger-touchable icons arranged in the first array form, from a display edge of the touch display, wherein the first user interface and the second user interface are respectively located on two adjacent surfaces of a 3D motion user interface.

6. The method according to claim 5, wherein the step of determining whether or not the position of the touch on the touch display is changed comprises:

calculating a moving distance of the touch within a predetermined time;

determining whether or not the moving distance is greater than a predetermined value; and determining that the position of the touch is changed if the moving distance is greater than the predetermined value.

7. The method according to claim 5, further comprising:

switching the first user interface to the second user interface via another touch on the specific area.

8. The method according to claim 5, wherein the step of switching the second user interface comprises:

dragging the first user interface out from the display edge of the touch display closest to the touch and displaying the first user interface.

9. The method according to claim 5, wherein the step of switching the second user interface to the first user interface comprises:

switching the second user interface to the first user interface according to a moving direction of the touch; and dragging the first user interface out from the display edge of the touch display opposite to the moving direction and displaying the first user interface.

10. The method according to claim 5, wherein the 3D motion user interface is configured to rotate around an axis.

11. A non-transitory computer readable storage medium, for storing a program, the program executing following steps:

displaying a first user interface having a first plurality of finger-touchable icons arranged in a first array form on a touch display, wherein each of the first plurality of finger-touchable icons is corresponding to an application program;

detecting a touch generated by an input tool;

determining whether or not the touch is generated on a specific area of the touch display;

determining whether or not the position of the touch on the touch display is changed if the touch is generated on the specific area; and if the touch is generated on the specific area and if it is determined that the position of the touch on the touch display is changed, activating a second user interface by dragging the second user interface, which has at least one timing information and at least one event notification, out from a display edge of the touch display to replace the first user interface, having the first plurality of finger-touchable icons arranged in the first array form, on the touch display, wherein the specific area is close to the display edge, and wherein the first user interface and the second user interface are respectively located on two adjacent surfaces of a 3D motion user interface.

12. The non-transitory computer readable storage medium according to claim 11, wherein the step of determining whether or not the position of the touch on the touch display is changed comprises:
- calculating a moving distance of the touch within a predetermined time;
- determining whether or not the moving distance is greater than a predetermined value; and
- determining that the position of the touch is changed if the moving distance is greater than the predetermined value.

13. The non-transitory computer readable storage medium according to claim 11, wherein the timing information is associated with a time or a date, and the event notification is associated with a personal schedule or an unread message.

14. A non-transitory computer readable storage medium, for storing a program, the program executing following steps:
- displaying a first user interface having a first plurality of finger-touchable icons arranged in a first array form on a touch display, wherein each of the first plurality of finger-touchable icons is corresponding to an application program;
- detecting a touch generated by an input tool;
- determining whether or not the touch is generated on a specific area of the touch display;
- determining whether or not the position of the touch on the touch display is changed if the touch is generated on the specific area; and
- if it is determined that the touch is generated on the specific area and it is determined that the position of the touch on the touch display is changed, switching the first user interface, having the first plurality of finger-touchable icons arranged in the first array form, to a second user interface, having a second plurality of finger-touchable icons arranged in a second array form, from a display edge of the touch display, wherein each of the second plurality of finger-touchable icons is corresponding to an application program, and the first user interface and the second user interface are respectively located on two adjacent surfaces of a 3D motion user interface.

15. The non-transitory computer readable storage medium according to claim 14, wherein the step of determining whether or not the position of the touch on the touch display is changed comprises:
- calculating a moving distance of the touch within a predetermined time;
- determining whether or not the moving distance is greater than a predetermined value; and
- determining that the position of the touch is changed if the moving distance is greater than the predetermined value.

16. The non-transitory computer readable storage medium according to claim 14, wherein the 3D motion user interface is configured to rotate around an axis.

* * * * *